United States Patent [19]
Mueller

[11] Patent Number: 5,278,961
[45] Date of Patent: Jan. 11, 1994

[54] PHYSICAL ADDRESS TO LOGICAL ADDRESS TRANSLATOR FOR MEMORY MANAGEMENT UNITS

[75] Inventor: David C. Mueller, Colorado Springs, Colo.

[73] Assignee: Hewlett-Packard Company, Palo Alto, Calif.

[21] Appl. No.: 483,153

[22] Filed: Feb. 22, 1990

[51] Int. Cl.[5] .................. G06F 12/10; G06F 9/455; G06F 11/30

[52] U.S. Cl. ................................. 395/400; 395/500; 395/575

[58] Field of Search ..................... 395/400, 500, 575

[56] References Cited

U.S. PATENT DOCUMENTS

| | | | |
|---|---|---|---|
| 4,482,952 | 11/1984 | Akagi | 395/400 |
| 4,636,940 | 1/1987 | Goodwin, Jr. | 395/700 |
| 4,825,412 | 4/1989 | Sager et al. | 395/400 |
| 4,954,942 | 9/1990 | Masuda et al. | 395/500 |
| 5,003,459 | 3/1991 | Ramanujan et al. | 395/400 |

*Primary Examiner*—Joseph L. Dixon

[57] ABSTRACT

Methods and apparatus for translating a physical address to a logical address for use with a processor which includes an on-chip memory management unit. The apparatus includes an address capture circuit which is responsive to information on the processor bus during table searches by the memory management unit for determining logical addresses. A table address is subtracted from a table access address to provide a portion of the logical address during each level of the table search. The logical address portions are combined to provide the complete logical address. The logical address is stored in a map RAM and is accessed when the physical address is requested by the memory management unit. The logical address and corresponding data and status fields are simultaneously provided to an analyzer unit. The apparatus utilizes a pipeline structure for high speed operation.

17 Claims, 7 Drawing Sheets

| PIPELINE CYCLE / ELEMENT | 1 | 2 | 3 | 4 | 5 | 6 | 7 | 8 | 9 |
|---|---|---|---|---|---|---|---|---|---|
| CTA REGISTER | 0 | TABLE B ADDRESS | TABLE C ADDRESS | | | | | | |
| ADDRESS SHIFT | TABLE A ACCESS | TABLE B ACCESS | TABLE C ACCESS | | | | | | |
| SUB-TRACTOR REGISTER | | LEVEL A LOGICAL ADDRESS | LEVEL B LOGICAL ADDRESS | LEVEL C LOGICAL ADDRESS | | | | | |
| LOGICAL ADDRESS BUILDER | | | LEVEL A | LEVEL A & LEVEL B | LEVEL A & LEVEL B & LEVEL C | LOGICAL ADDRESS 1 | | | |
| POD INTERFACE | | | | PHYSICAL ADDRESS 2 | PHYSICAL ADDRESS 2 | | | | |
| OFFSET HOLD | | | | | PHYSICAL ADDRESS 1 | PHYSICAL ADDRESS 2 | | | |
| MAP HOLD | | | | | | MAPPED PHYSICAL ADDRESS 1 | MAPPED PHYSICAL ADDRESS 2 | | |
| LOGICAL ADDRESS HOLD | | | | | | | LOGICAL ADDRESS 1 | LOGICAL ADDRESS 2 | |
| ANALYSIS INTERFACE | | | | | | | | LOGICAL ADDRESS 1 & DATA & STATUS | LOGICAL ADDRESS 2 & DATA & STATUS |

PHYSICAL ADDRESS TO LOGICAL ADDRESS TRANSLATOR FOR MEMORY MANAGEMENT UNITS

FIELD OF THE INVENTION

This invention relates to systems for analyzing the operation of microprocessors and, more particularly, to methods and apparatus for translating a physical address to a logical address during program execution by a microprocessor having an on chip memory management unit.

BACKGROUND OF THE INVENTION

Emulation systems are utilized by hardware and software engineers to assist in the development of microprocessor based systems. Emulation systems typically include a processor-specific board, a cable for connection to a target system and various analysis units. The functional, timing and electrical signal characteristics of the emulator should match those of the microprocessor which will eventually control the target system. The tasks facilitated by an emulator include software debug, hardware debug, and hardware and software integration. These tasks can be implemented using emulator features such as program loading and execution, run/-stop controls, memory display and modification, global and local symbols display, internal resource display and modification, analysis, program stepping, resource mapping, memory characterization, breakpoint generation and clock source selection. An important function of emulation systems is analysis of processor operation. Typically, the emulator is connected to the processor bus and analyzes operation by monitoring each processor bus cycle in which the processor communicates with memory and other devices.

Virtual memory systems were developed in response to large computer programs and multitasking computer systems. As programs became larger, the memory that is directly accessible by the processor could no longer contain the entire program and its data. In multitaskinq systems, several programs may be active at once, with the CPU being time shared between programs. Virtual memory systems permit execution of large programs and multitasking in a physical memory of practical size.

Virtual memory systems manage physical memory by allocating a large virtual, or logical, address space to physical memory as needed. Portions of the logical address space may be transferred to a mass storage device, such as a disk, and are activated in physical memory when needed. The CPU executes programs in the logical address space. A memory management unit cooperates with the operating system to translate logical addresses requested by the execution unit of the CPU into physical addresses. When a logical address is not located in the physical address space, a portion of the logical address space must be activated in main memory. Both logical addresses and physical addresses are grouped into pages which may contain a selected number of bytes. Data is transferred between physical memory and a mass storage device in pages. In other virtual memory systems, the entire logical address space is contained in physical memory, and a mass storage device is not required.

The relation between logical addresses and physical addresses in a virtual memory system is controlled by a memory management unit. The translation between logical addresses and physical addresses is specified by a table structure. A logical address requested by the execution unit is translated by the memory management unit into a physical address which is then used to access a location in physical memory.

In order to improve the operating speed of microprocessors, memory management units have been placed on the same chip, or integrated circuit, with the unit which executes programs in the logical address space. This configuration minimizes the time from the generation of the logical address to generation of the corresponding physical address. An example of such a processor is the MC68030 manufactured and sold by Motorola, Inc. The MC68030 microprocessor utilizes a demand paged memory management unit in which logical address to physical address translations are determined only as they are requested by the executing program.

In order for an emulation system to analyze the execution of a program, it is necessary for the state analyzer portion of the emulation system to know the logical addresses being accessed. The logical addresses can be related to the absolute and symbolic values of the original source code written by the user. However, when the microprocessor contains an on-chip memory management unit, only the physical addresses are available at the pins of the processor chip. The physical addresses do not provide the state analyzer with the information necessary to analyze program execution. Thus, it has been difficult to monitor and analyze the operation of microprocessors having on-chip memory management units.

It is a general object of the present invention to provide improved systems for analyzing the operation of microprocessors.

It is another object of the present invention to provide methods and apparatus for translating physical addresses provided by a memory management unit to logical addresses.

It is a further object of the present invention to provide methods and apparatus for determining logical addresses by monitoring table searches used by a processor for translating logical addresses to physical addresses.

It is a further object of the present invention to provide methods and apparatus for translating physical addresses provided by a memory management unit associated with a processor to logical addresses in real time during execution of a program by the processor.

SUMMARY OF THE INVENTION

According to the present invention, these and other objects and advantages are achieved in methods apparatus for translating a physical address into a corresponding logical address, the methods and apparatus being adapted for use with a processor which includes a memory management unit. The apparatus translates a physical address provided by the memory management unit into a logical address. The apparatus and methods of the present invention are typically utilized in emulation systems and, more particularly, in emulation systems which analyze processor operation. The apparatus and methods of the invention are typically utilized with a microprocessor which includes an on chip memory management unit. In microprocessors of this type, logical addresses requested by the execution unit are not available at external pins of the integrated circuit.

The apparatus includes a bus for communicating with the processor, address capture means responsive to information on the bus means during table searches by the memory management unit for determining logical addresses, storage means for storing the logical addresses at locations identified by corresponding physical addresses, and access means responsive to a physical address provided by the memory management unit during program execution for accessing the corresponding logical address in the storage means and providing the corresponding logical address on an output. The output is typically connected to an analyzer unit.

The address capture means operates during a table search by the memory management unit and obtains a portion of the logical address during each level of the table search. The table search operates by accessing successive levels of a table structure to obtain the physical address which corresponds to the logical address requested by the execution unit. The address capture means utilizes the information available on the bus during the table search to determine the logical address. The address capture means includes subtractor means for subtracting a table address from a table access address and providing a logical address portion during each level of the table search, and means for combining the logical address portions from each level of the table search into a logical address.

The logical address is stored in a map RAM having a plurality of storage locations for logical addresses. Each storage location corresponds to and is addressable by a physical address. On the bus cycle following completion of the table search, the physical address is placed on the bus by the memory management unit. The physical address accesses a location in the map RAM where the corresponding logical address is stored. In the bus information provided to the analyzer unit, the physical address is replaced by the logical address. In subsequent requests for the physical address, the map RAM is accessed in order to obtain the corresponding logical address.

The apparatus of the invention utilizes a pipeline structure having three parallel paths. An address capture path is responsive to bus information during table searches by the memory management unit for determining and storing logical addresses. A translation path is responsive to physical addresses provided by the memory management unit during program execution for accessing corresponding logical addresses that were determined and stored by the address capture path and providing the logical address to an analyzer. A transfer path provides data and status fields corresponding to each physical address. The data and status fields are provided to the analyzer simultaneously with the logical address which corresponds to each physical address.

According to another aspect of the invention, there is provided a method for translating a physical address provided by a memory management unit into a corresponding logical address. The method comprises the steps of subtracting a table address from a table access address at each level of a table search by the memory management unit to provide logical address portions, and combining the logical address portions into a logical address.

BRIEF DESCRIPTION OF THE DRAWINGS

For a better understanding of the present invention, together with other and further objects, advantages and capabilities thereof, reference is made to the accompanying drawings which are incorporated herein by reference and in which.

DETAILED DESCRIPTION OF THE INVENTION

Figure 1:
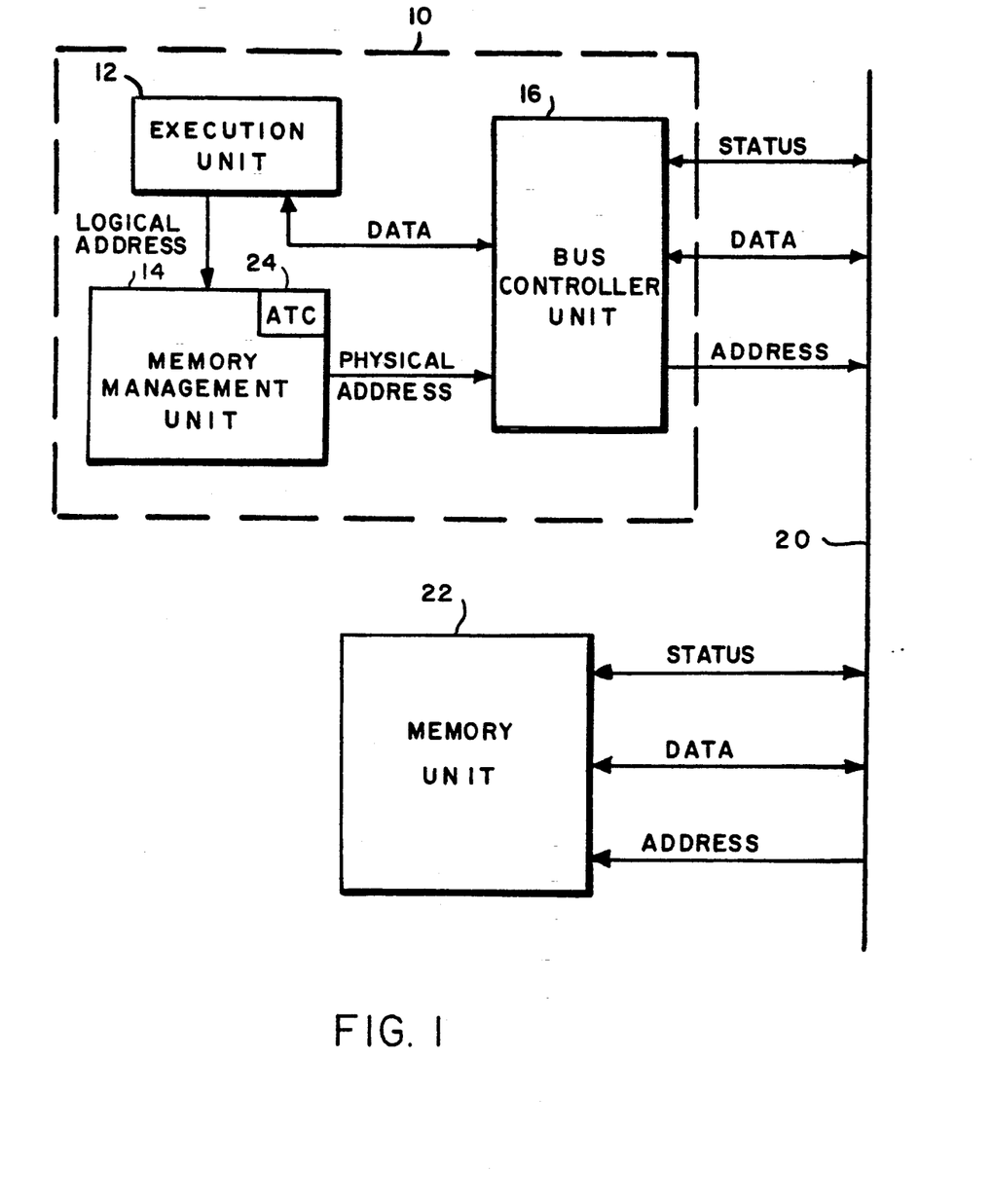
FIG. 1 is a block diagram of a microprocessor system having an on-chip memory management unit.

A simplified block diagram of a microprocessor system is shown in FIG. 1. A microprocessor 10 includes an execution unit 12, a memory management unit 14 and a bus controller unit 16. The execution unit 12 generates logical addresses and data during program execution. The logical addresses are provided to the memory management unit 14, which translates the logical addresses to physical addresses. Data from the execution unit 12, physical addresses from the memory management unit 14 and status information are coupled by the bus controller unit 16 to a system bus 20. Physical addresses are coupled on bus 20 to a memory unit 22 for accessing specified locations in memory unit 22. Different pages of the logical address space may be transferred into the memory unit 22 from a mass storage unit (not shown) as required.

An important feature of the microprocessor 10 is that the execution unit 12 and the memory management 14 are located on the same integrated circuit. The logical addresses generated by the execution unit 12 during program execution are not available on external pins of the microprocessor 10 and therefore cannot be monitored by an external analysis system. An example of such a microprocessor 10 is the MC68030 Processor. As described above, the inability to determine logical addresses during program execution is a significant disadvantage in analysis and monitoring of microprocessor operation.

In accordance with the present invention, methods and apparatus are provided for determining and storing logical addresses during a table search by the processor 10 and for subsequently translating physical addresses to logical addresses during program execution by the processor 10. The present invention permits analysis of microprocessor operation even when the memory management unit and the execution unit are on the same integrated circuit.

The table search is performed by the processor 10 in order to translate logical addresses requested by an executing program into physical addresses, which are used to access memory unit 22. As discussed above, addresses are grouped together in blocks called pages. The blocks typically have the same size, but may have different sizes. The page size in the memory management unit of the MC68030 Processor can be configured from 256 bytes to 32K bytes. Selection of page size is typically done when the processor bootstrap program is executed. The memory management unit 14 contains an address translation cache 24 that holds a specified number of logical to physical address translations. As pages of logical address are requested by the execution unit 12, the memory management unit 14 determines the physical page address using the table search and stores the logical to physical translation in the address translation cache. When the address translation cache becomes full, an algorithm known as "least recently used" determines the entry that can be removed to accomodate the next logical page requested. The address translation cache holds the most recently used translations, so that subsequent accesses to those pages do not require that the table search be repeated to obtain the physical address. Instead, the address translation cache is indexed with the requested logical address and outputs the physical address.

The address translation cache in the memory management unit 14 of the MC68030 Processor is limited in size to 22 entries. A table structure in a portion of physical memory (memory unit 22) identifies the portions of the executing program which actually reside in the physical memory. The memory management unit 14 accesses the table structure when determining the physical page corresponding to a requested logical page that is not included in the address translation cache. The process of accessing the table structure is called the table search, or table walk, process. The MC68030 Processor utilizes a demand paged memory management unit in which logical address to physical address translations are determined only as they are requested by the executing program.

Figure 2:
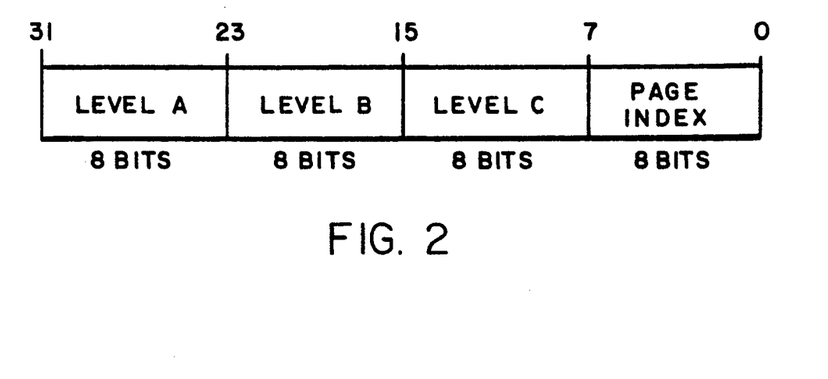
FIG. 2 is a schematic diagram which illustrates an example of a 32 bit logical address having three logical and a page index.
Figure 3:
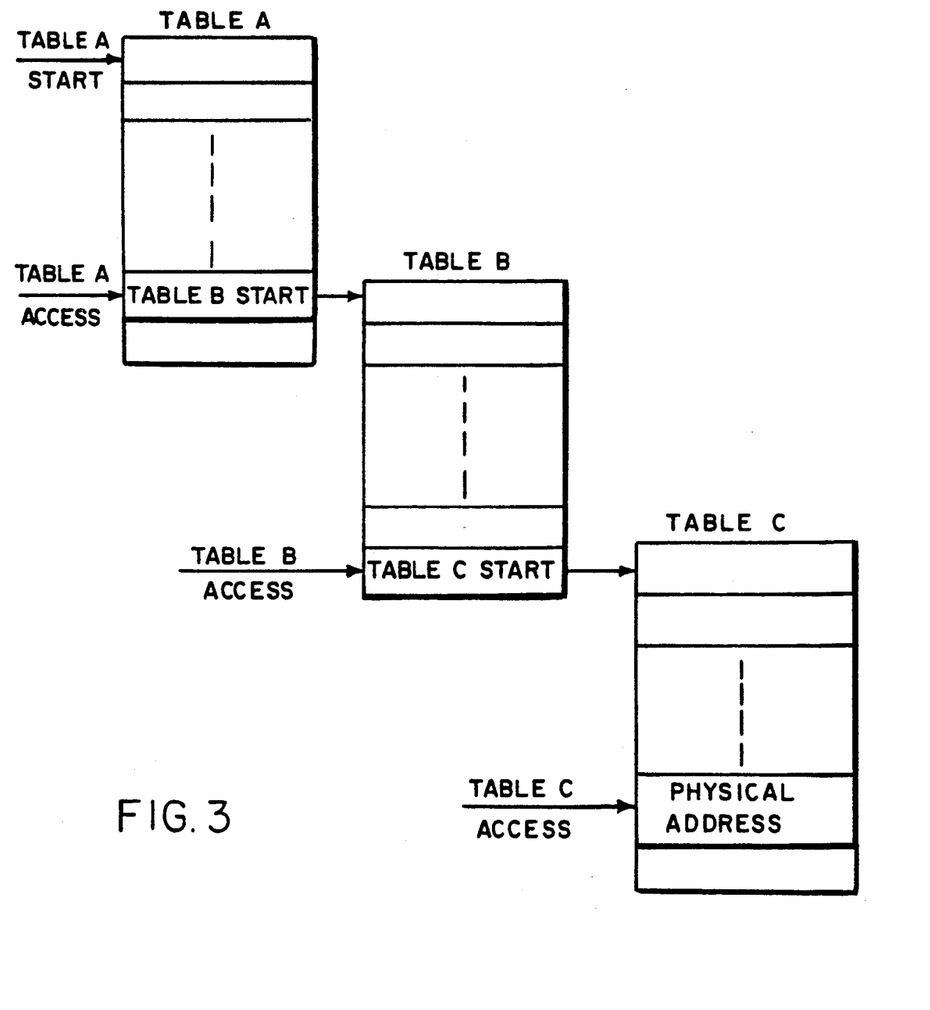
FIG. 3 is a schematic diagram which illustrates a table search used by the memory management unit to translate a logical address to a physical address.

The table structure is determined by the configuration of the memory management unit 14 and may have a multiple level organization. The number of levels in the table structure corresponds to the structure of the logical address. An example of a logical address is shown in FIG. 2 and the corresponding table structure is shown in FIG. 3. The table structure is flexible to minimize the required table space in physical memory and the time required to access the table structure, while providing flexibility of memory management.

The logical address shown in FIG. 2 includes a page index of 8 bits and three levels of logical address, each of 8 bits, for a total of 32 bits. The three parts of the logical address are designated as level A, level B and level C. The page index, the lowest order portion of the logical address, is not translated. Instead, the page index is used directly to index to the desired entry in the physical page. Since the page index in this example is 8 bits, the page size is 256 bytes. The page index can be up to 15 bits for the MC68030 Processor.

When a physical address must be accessed and the address translation cache does not contain the logical to physical translation for that page, the memory management unit 12 initiates the table search process. The table search begins by determining the starting address of the table structure. A register in the memory management unit 14 contains the starting address of the table structure, sometimes called a root pointer. Referring now to FIG. 3, the starting address or root pointer of the table structure points to the start of table A. The level A portion of the logical address is added to the table A starting address to obtain a table A access address. The data entry contained at the table A access address is the starting address of table B. Other entries in table A point to other level B tables. The level B portion of the logical address is added to the table B starting address to obtain a table B access address. Similarly, the data entry at the table B access address is the starting address of table C. The level C portion of the logical address added to the table C starting address to provide a table C access address. The data entry in table C is the required physical address. The physical address is returned to the processor 10 and is placed in the address translation cache. The table search process requires three bus cycles to complete a three level search.

The table search process operates according to the following algorithm for each level.

$$\text{Level N access address} = \text{level N table address} + \text{level N logical address} \quad (1)$$

where level N access address is the address provided by the processor 10 on each bus cycle of the table search process, level N table address is the address of the start of each table and level N logical address is the portion of the logical address which is used in indexing into each table. The level N table address is returned to the memory management unit from the table structure in the N−1 bus cycle. In the first level access of the table search process, the level A table address is contained in the memory management unit root pointer register.

The address translation apparatus of the present invention determines the logical address corresponding to a specified physical address by monitoring the above described table search process. The required information to provide a complete logical address are the level A, level B and level C portions of the logical address. As noted above, the page index portion of the logical address is not translated. The logical address portions for each level are determined by solving Equation (1) for the level N logical address. Thus, $$\text{Level N logical address} = \text{level N access address} - \text{level N table address} \quad (2)$$

The level N access address is provided on the address bus of the processor 10 during each bus cycle of the table search process. The level N table address appears on the data bus during each N−1 bus cycle. That is, the table address for the current level is the data returned to the processor on the previous bus cycle. As each portion or level of the logical address is determined during the table search process, it is stored in a register that concatenates each logical address portion into a complete logical address. When the entire logical address has been constructed, it is stored in a RAM array.

Figure 4:
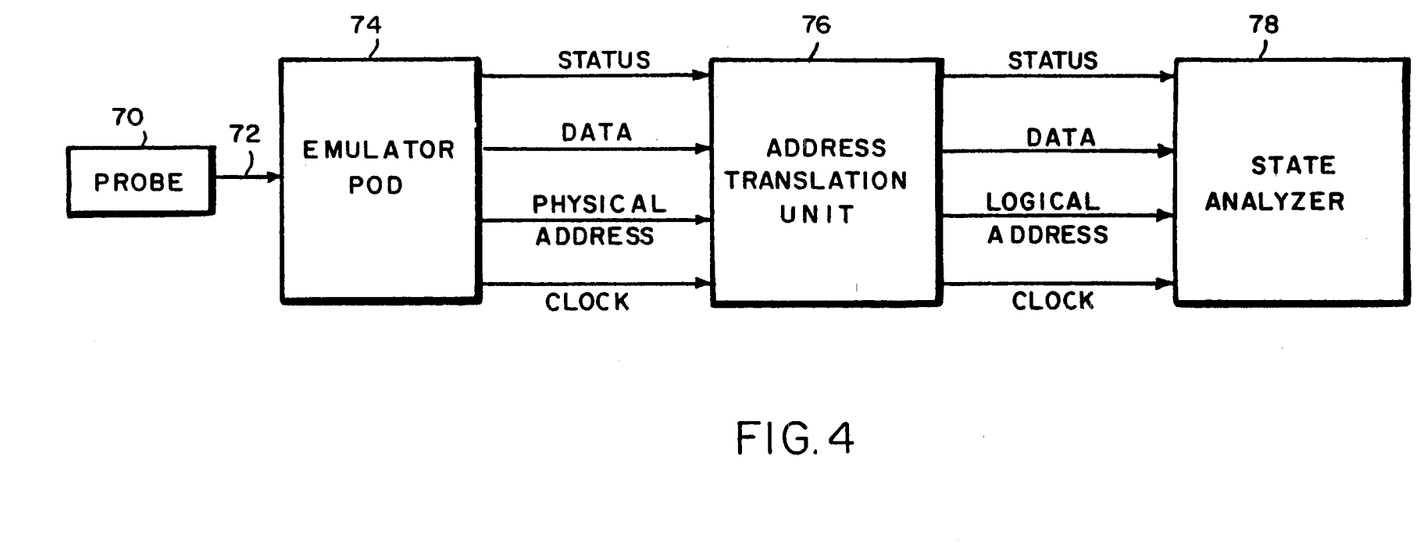
FIG. 4 is a simplified block diagram of an emulation system which incorporates an address translation unit in accordance with the present invention.

An emulation system incorporating the present invention is shown in block diagram form in FIG. 4. A probe 70 connects to the processor 10. The probe 70 is connected by a cable 72 to an emulator pod 74. The function of the emulator pod 74 is to provide conventional emulation features. A status field, a data field, an address field and a clock signal are connected from the emulator pod 74 to an address translation unit 76. The status, data and address fields contain substantially the same information as the information on processor bus 20. The address field contains the physical address requested by the execution unit 12. The address translation unit 76 translates the physical address provided by the processor into a logical address and provides logical address, data and status fields to a state analyzer 78. The state analyzer 78 utilizes the logical address, data and status information from the processor 10 during program execution to analyze and measure processor operation.

Figure 5:
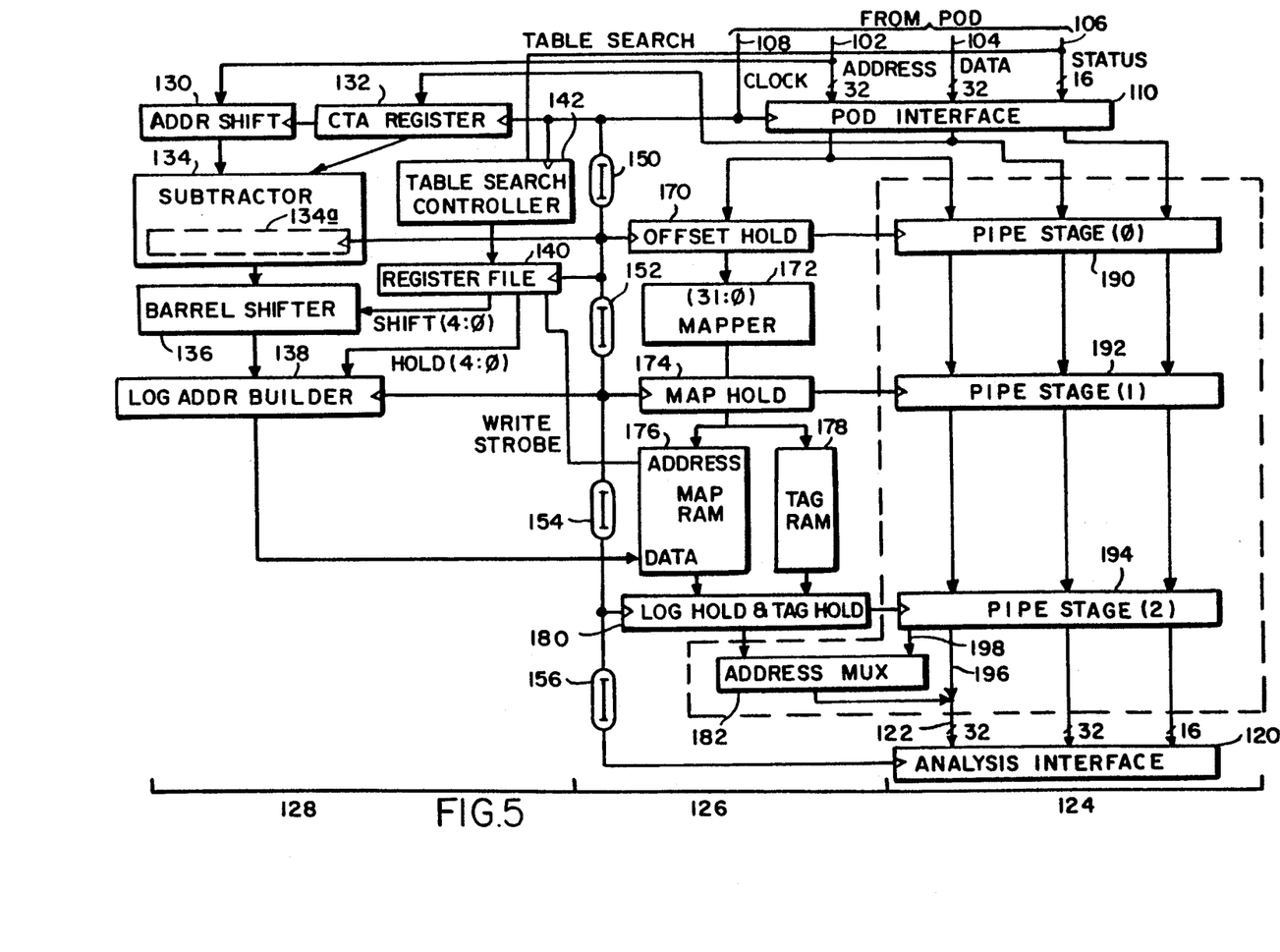
FIG. 5 is a block diagram of the address translation unit.

A block diagram of the address translation unit 76 in accordance with the present invention is shown in FIG. 5. The address translation unit receives processor bus cycle information from the emulator pod 74. The processor bus cycle information includes an address field 102, a data field 104 and a status field 106. The address and data fields 102, 104 are each 32 bits, and the status field 106 is 16 bits. The address field 102 usually contains a physical address. A clock 108 received from the emulator pod 74 is a delayed version of the processor's active low address strobe (LAS). The bus cycle information from emulator pod 74 is stored in a pod interface register 110.

The output to the state analyzer 78 is stored in an analysis interface register 120. The analysis interface register 120 receives data field 104, status field 106 and an address field 122. The address field 122 is usually a logical address, but in some cases can be a physical address as described below. The address translation unit uses a pipeline architecture to handle the 33 megahertz bus rate of the MC68030 processor. A pipeline is a commonly used architecture which provides high speed operation. Information is sequentially transferred through several pipeline stages, and operations are performed at each stage. Each stage includes functional circuitry and a stage register. Since different functions are being performed simultaneously in the stages of the pipeline, overall operating speed is high.

The pipeline structure of the address translation unit shown in FIG. 5 has three parallel paths between the input from the emulator pod 74 and the output to the state analyzer 78. A physical path 124 transfers the physical address, data and status fields from the emulator pod to the state analyzer 78. A translation path 126 performs a translation of the physical address to a logical address. An address capture path 128 determines logical addresses during table searches by the memory management unit. The physical path 124 and the translation path 126 have the same number of pipeline stages so that the physical address reaches the address selector at the same time as the logical address. The address capture path 128 has fewer stages than the physical path and the translation path. After the logical address has been generated, it is transferred into the translation path 126.

Figure 6:
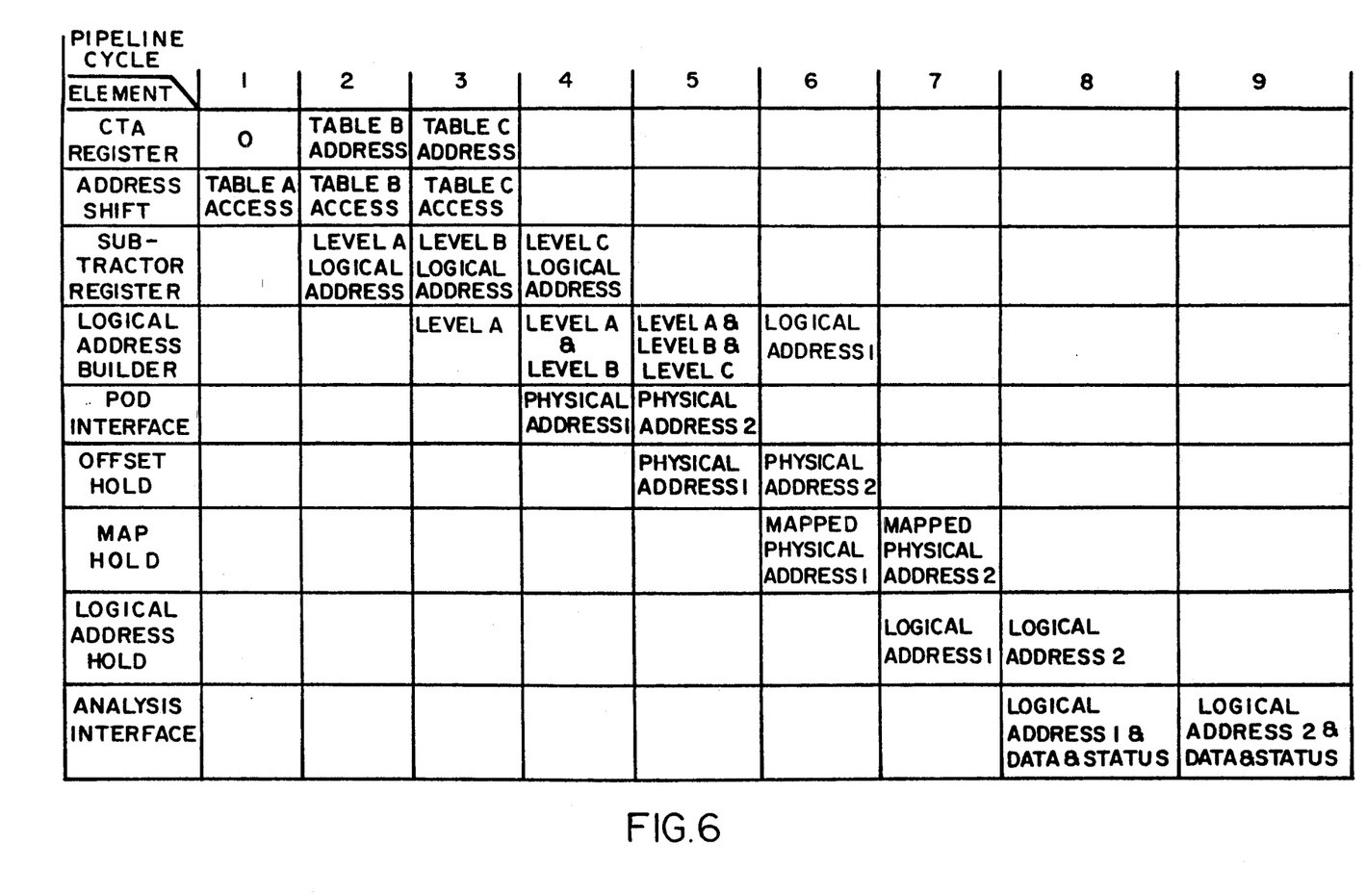
FIG. 6 is a pipeline timing diagram which illustrates the operation of the address translation unit of FIG. 5.

The address field 102, the data field 104 and the status field 106 are transferred into the pod interface register 110 by clock 108. Clock 108 also transfers the address field 102 into an address shift register 130 and transfers the data field 104 at the output of pod interface register 110 into a current table address (CTA) register 132. The output of address shift register 130 is connected to one input of a subtractor 134, and the output of CTA register 132 is connected t the other input of subtractor 134. The subtractor 134 contains a register 134a which holds the results of the subtraction. The output of subtractor register 134a is connected to the input of a barrel shifter 136. The output of barrel shifter 136 is connected to the input of a logical address builder 138. The barrel shifter 136 and the logical address builder 138 are controlled by shift and hold signals, respectively, from a register file 140. The register file 140 is controlled by a table search controller 142. The table search controller provides signals to control operation of the address translation unit as shown in FIG. 6 and described hereinafter. The address shift register 130, the CTA register 132, subtractor 134, barrel shifter 136, logical address builder 138, register file 140 and table search controller 142 comprise the elements of the address capture path 128 of the address translation unit.

The clock 108 is coupled through successive delay lines 150, 152, 154 and 156, each of which has a delay of about 50 nanoseconds. The outputs of delay lines 150, 152, 154 and 156 provide delayed clocks for controlling the operation of the pipelined address translation unit.

The translation path 126 of the pipeline structure includes an offset hold register 170. The address field 102 at the output of pod interface register 110 is connected to the input of offset hold register 170. The offset hold register 170 is strobed by the output of delay line 150. The output of offset hold register 170 is connected to the input of a mapper 172.

The mapper 172 converts the physical address in the address field 102 to an address suitable for accessing a map RAM where physical-to logical address translations are stored. The mapper 172 also checks the physical address to determine if it is within an allowed range of addresses for which translations can be performed by the address translation unit. The physical address is compared in the mapper 172 with a lower boundary of the allowed address range and with an upper boundary of the allowed address range. A "not-mapped" signal is provided when the physical address is outside the allowed range of addresses for which translations can be performed. When the physical address is within the allowed range of addresses, a pattern is added to the physical address to provide a mapped physical address. In some cases, the physical address cannot be translated even though it is within the allowed range of addresses. In this case, the mapper 172 generates a tag bit which indicates whether the particular physical address is valid and can be translated. Thus, the not-mapped signal and the tag bit both identify physical addresses for which the address translation unit did not perform a translation.

The output of mapper 172 is connected to the input of a map hold register 174. Map hold register 174 is strobed by the output of delay line 152. The output of map hold register 174 is connected to the address inputs of a map RAM 176 and the address inputs of a tag RAM 178. The tag RAM 178 contains one bit for each location in the map RAM 176 and indicates whether the data contained in each map RAM location represents a valid logical address. The map RAM 176 receives data inputs from logical address builder 138 and a write strobe signal from the register file 140. The outputs of map RAM 176 and tag RAM 178 are connected to the inputs of a logical address hold and tag hold register 180. The register 180 is strobed by the output of delay line 154. The output of register 180 is connected to one input of an address multiplexer 182. The address multiplexer 182 is controlled by the tag bit from tag RAM 178 and the not-mapped signal from the mapper 172. The offset hold register 170, mapper 172, map hold register 174, map RAM 176, tag RAM 178, register 180 and address multiplexer 182 comprise the elements of the address translation path 126 of the pipeline structure.

The map RAM 176 has sufficient capacity to hold translations for each page in physical memory. In a preferred embodiment, the map RAM contains 64 K locations, each of 24 bits. The 24 bits correspond to the upper order bits of the logical address. The tag RAM 178 has one bit location corresponding to each location in the map RAM 176. Thus, in the preferred embodiment the tag RAM 178 is 64K×1 bit.

The physical path 124 of the pipeline structure includes registers 190, 192 and 194. The address field 102, the data field 104 and the status field are successively shifted through pod interface register 110, register 190, register 192, register 194 and then into analysis interface register 120. Register 190 is strobed by the output of delay line 150, register 192 is strobed by the output of delay line 152, register 194 is strobed by the output of delay 154 and analysis interface register 120 is strobed by the output of delay line 156.

At the outputs of register 194, the lowest order 8 bits of the address field are coupled on a bus 196 directly to the analysis interface register 120. The 24 upper order bits of the address field are connected on a bus 198 to the other input of address multiplexer 182. The lower order 8 bits of the physical address are the same as the low order 8 bits of the logical address and represent the page index. Since the low order 8 bits of the physical address are not altered, they are connected directly to the analysis interface register 120 and are not part of the address translation process. The address multiplexer 182 can select either a logical address from register 180 or a physical address from register 194 depending on the state of the tag bit and the mapper 172 not-mapped output. In some cases, a translation from a physical address to a logical address cannot be performed, and the physical address is provided to the state analyzer 78. The physical address is provided by multiplexer 182 when the not-mapped signal is active, indicating that the physical address is outside the allowed address range of the translation unit, or when the tag bit is active, indicating that the physical address is within the allowed address range but not translated.

The stages of the pipeline structure can be identified with reference to FIG. 5. The pod interface register 110, address shift register 130 and CTA register 132 represent an emulator pod interface stage, which is strobed by clock 108. The subtractor register 134a, the offset hold register 170 and register 190 represent a first pipeline stage, which is strobed by the output of delay line 150. The logical address builder 138, the map hold register 174 and the register 192 represent a second pipeline stage, which is strobed by the output of delay line 152. The logical address hold and tag hold register 180 and register 194 represent a third pipeline stage, which is strobed by the output of delay line 154. Analysis interface register 120 the is interface to state analyzer 78 and is strobed by the output of delay line 156.

The operation of the address translation unit of FIG. 5 is described with reference to the pipeline timing diagram of FIG. 6. Each of the vertical columns in FIG. 6 represents one pipeline cycle in the address translation unit of FIG. 5. Nine pipeline cycles are shown.

During the first three pipeline cycles of FIG. 6, the processor 10 is performing a table walk, or table search, and the address capture path 128 of the translation unit 76 is performing an address capture. A table search is identified by a table signal provided by the processor and incorporated into the status field 106. A table search is performed when the required logical to physical address translation is not contained in the address translation cache 24 of the memory management unit. After initialization of the processor, the address translation cache is empty, and all memory access requests by the execution unit 12 require a table search to determine a corresponding physical address. As table searches are performed, the address translation unit 76 stores the translations for future reference as described hereinafter.

Assume that a table search has been initiated by the processor in accordance with the examples shown in FIGS. 2 and 3 and described hereinabove. In the first phase of the table search as shown in pipeline cycle 1 of FIG. 6, a table A access address appears in the address field 102 and is stored in address shift register 130. As discussed hereinabove, the table A starting address or root pointer is not externally available in the MC68030 processor. Therefore, a zero is loaded into the CTA register 132 during the first phase of the table search process. In order to insure that a correct logical address is determined in accordance with the present invention, the processor user is required to set the lower order 8 bits of the root pointer register in the processor to zero. This requirement does not impose a significant limitation on the use of the processor.

In the second pipeline cycle, the subtractor 134 determines the difference between the table A access address and the table A address (zero) and stores the result (the level A logical address portion) in subtractor register 134a. During the first pipeline cycle, the processor accessed a particular entry in table A specified by the table A access address. The data returned from table A in the data field 104 during the first pipeline cycle is the table B address. The table B address is loaded from the output of the pod interface register 110 into the CTA register 132, and the table B access address is loaded from the incoming address field 102 into address shift register 130 during the second pipeline cycle. The data field returned from table B during the second pipeline cycle is the table C access address.

The table C access address is loaded into the CTA register 132 during the third pipeline cycle, and the table C access address is loaded into address shift register 130. During the third pipeline cycle, the subtractor 134 determines the difference between the table B access address and the table B address and stores the result (the level B logical address portion) in subtractor register 134a. Also during the third pipeline cycle, the level A logical address portion is loaded into the level A portion of the logical address builder 138 as described in more detail hereinafter.

During the fourth pipeline cycle, the level C logical address portion is determined as the difference between the table C access address and the table C address and is loaded into the subtractor register 134a. Also, the level B logical address, which was determined during the third pipeline cycle, is loaded into the logical address builder 138. During the first three pipeline cycles shown in FIG. 6, the processor completes the table search process. In pipeline cycle 4, physical address 1 which was determined by the processor as a result of the table search process, appears in the address field 102 and is loaded into the pod interface register 110.

During pipeline cycle 5 the level C logical address is loaded from the subtractor register 134a into the logical address builder 138 to thereby complete logical address 1. Also during pipeline cycle 5, physical address 1 is transferred from pod interface register 110 to offset hold register 170. In the present example, it is assumed that the next logical address requested by the execution unit 12 is contained in the address translation cache of the memory management unit 14 and that no table search is necessary. Thus, a second physical address appears on the next bus cycle. Physical address 2 is loaded into the pod interface register 110 during pipeline cycle 5.

In pipeline cycle 6 the mapped version of physical address 1 is loaded into map hold register 174 and addresses map RAM 176 and tag RAM 178. The logical address 1 contained in logical address builder 138 is the data for the map RAM 176. If the physical address 1 is determined by mapper 172 to be a valid physical address, a bit is loaded into the corresponding address of the tag RAM 178 to indicate that a valid logical address is contained in the map RAM 176 for this physical address. Also during pipeline cycle 6, physical address 2 is transferred from the pod interface register 110 to the offset hold register 170.

During pipeline cycle 7, logical address 1 and the tag bit are transferred into the logical address hold and tag hold register 180. Also during pipeline cycle 7, the mapped version of physical address 2 is loaded into map hold register 174 and addresses the previously stored logical address.

During pipeline cycle 8, the logical address 1 is transferred from register 180 to the analysis interface register 120. Assuming that the tag bit indicates a valid logical address, the address multiplexer 182 selects the output of the register 180 and provides the upper 24 bits of the logical address to the analysis interface register 120. As discussed above, the lower order 8 bits are the same for the physical address and the logical address and are not altered. Thus, the lower order 8 bits of the logical address are provided through the physical path 124 of the pipeline structure via bus 196. During the eighth pipeline cycle, the data and status fields which correspond to logical address 1 reach the analysis interface register 120. Also during the eighth pipeline cycle, logical address 2, which corresponds to physical address 2, is accessed in map RAM 176 and is transferred into register 180.

During the ninth pipeline cycle, logical address 2 is transferred into the analysis interface register 120 in the same manner as logical address 1.

It will be understood that during normal operation of the processor, a continuous stream of table searches and physical addresses are provided by the processor in a sequence determined by the program being executed and by the frequency with which it is necessary to perform table searches. The disclosed address translation unit accepts the bus cycle information from the processor, performs the required operations and transfers the bus cycle information to the state analyzer with the physical address translated to a logical address. The translation unit 76 causes a delay between information received at the pod interface register 110 and the information provided to the analysis interface register 120 of approximately 200 nanoseconds.

In the above-described example, the logical address has an 8 bit page index and a three level logical address format. It will be understood that the processor can be configured to provide other logical address formats. Thus, for example, the page index can include more than 8 bits. In addition, the logical address can contain less than three levels, and the number of bits in each logical address level can be more or fewer. Different logical address formats are accommodated in the address translation unit 76 by examining the initialization information provided to the processor and adjusting the number of bits utilized in the various operations of the address capture and translation operations.

Figure 7:
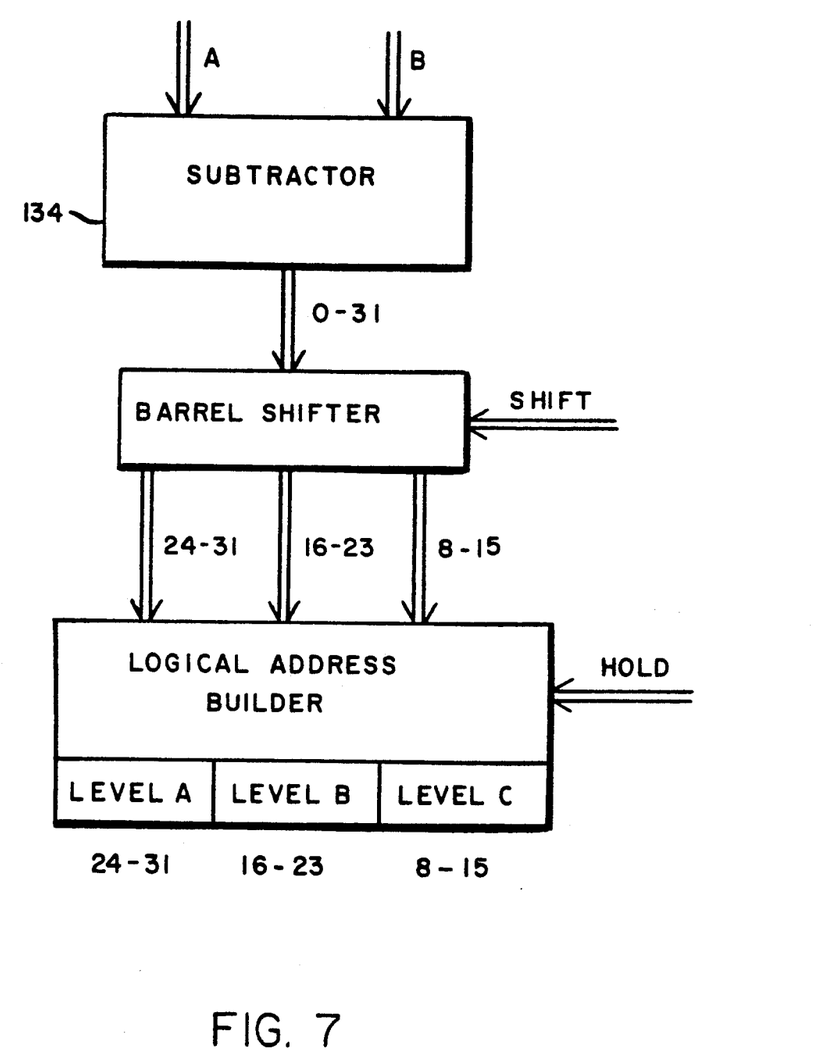
FIG. 7 is a block diagram which illustrates the operation of the barrel shifter and logical address builder of FIG. 5.

The operation of the barrel shifter 136 and the logical address builder 138 are described in more detail with reference to FIG. 7. The subtractor 134 provides logical address portions during successive cycles of a table search. The logical address portions always appear on the same set of output lines from subtractor 134 and must be transferred into the appropriate bit positions in the logical address. The level A logical address portion provided by subtractor 134 must be shifted to bit positions 24 to 31 of the logical address (see FIG. 2). The level B logical address portion must be shifted to bit positions 16 to 23, and the level C logical address portion must be shifted to bit positions 8 to 15. The barrel shifter 136 provides the required shift in bit positions based on the shift signal received from the register file 140. The shift signal is a five bit signal which indicates the number of bits positions to be shifted by barrel shifter 136. The barrel shifter 136 can, for example, be a type SN74AS8838 manufactured by Texas Instruments.

The logical address builder 138 includes a register for holding the logical address and logic which controls the successive inputs of logical address portions to build a complete logical address. The hold input is a five bit input which determines the number of bits of the logical address which are held in the previous state and the number of bits which are updated in accordance with the input from barrel shifter 136. When the level A logical address portion is received from barrel shifter 136, the hold input permits all bits in the register of the logical address builder 138 to be changed. During the next phase of the address build cycle, the hold input requires bits 24 to 31 (level A) to be held and permits the remaining bits to be changed). Thus, the level B logical address portion is loaded into bit positions 16 to 23. During the third phase of the address build cycle, the hold input requires bits positions 16 to 31 to be held (levels A and B) and permits bit positions 8 to 15 to be changed by the level C logical address portion. Now the complete 24 bit logical address has been constructed. As indicated above, the low order 8 bits of the logical address represent the page index and are not translated.

The address translation unit shown and described hereinabove is a hardware implementation of the invention, which provides real time translation of physical addresses to logical addresses. Thus, logical addresses are provided by the address translation unit 76 to the state analyzer 78 simultaneously with the corresponding data and status fields. This configuration permits the state analyzer to trigger on the logical address and to operate in real time.

The address capture technique of the present invention can also be implemented in software by post processing of the information that is available on the processor bus. For example, the bus information can be provided directly to the state analyzer 78 and stored. After a program is executed by the processor 10, the bus information can be processed in accordance with Equation (2) to obtain the logical address corresponding to a physical address.

Figure 8:
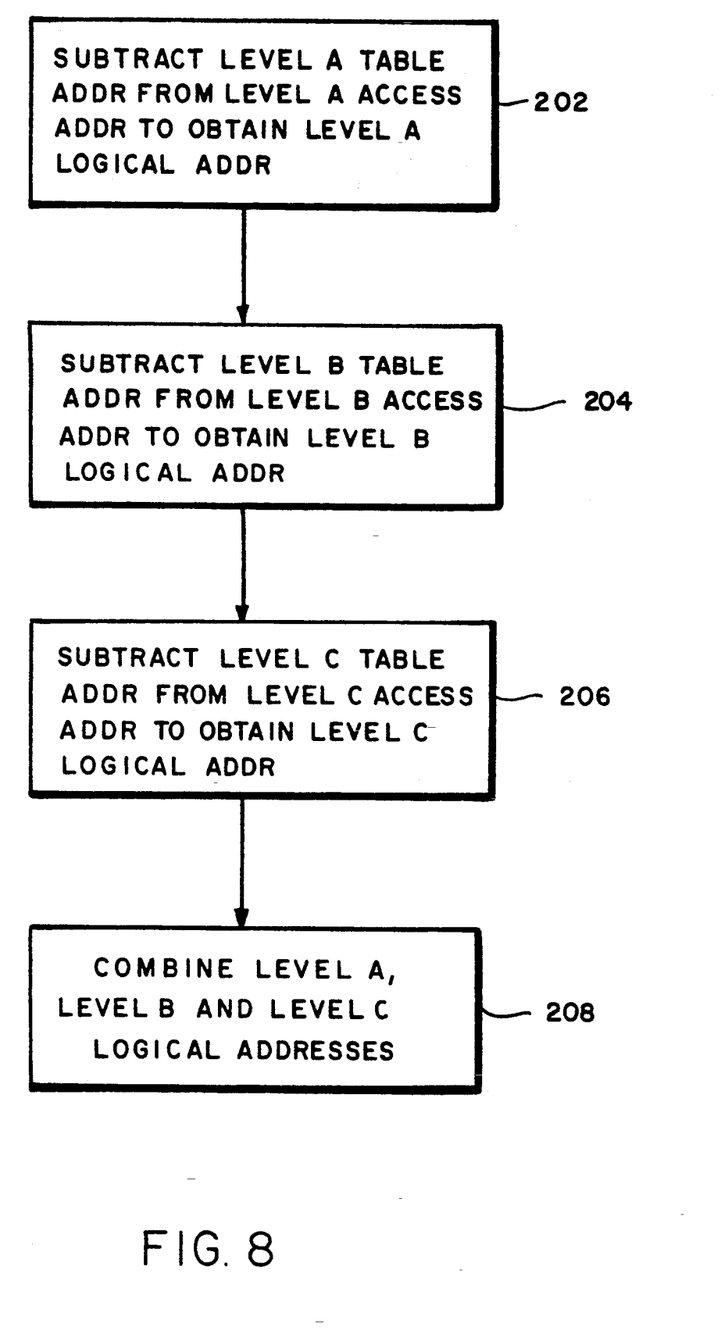
FIG. 8 is a flow diagram which illustrates the address capture algorithm of the present invention.

A flow diagram which illustrates the steps performed in determining the logical address is shown in FIG. 8. The flow diagram of FIG. 8 illustrates the algorithm for capturing a logical address during a table search by the processor and is applicable to both hardware and software implementations of the present invention. In a step 202, the level A table address is subtracted from the level A access address to obtain a level A logical address portion. During a step 204, the level B table address is subtracted from the level B access address to obtain a level B logical address portion. During a step 206, the level C table address is subtracted from the level C access address to obtain a level C logical address portion. During a step 208, the level A, level B and level C logical address portions are combined to provide the required logical address. It will be understood that the combining of logical address portions in step 208 can be performed as the logical address portions are calculated or can be performed after all the logical address portions have been calculated. Furthermore, the number of subtraction steps will be varied in accordance with the number of levels in the logical address and the corresponding number of levels in the table search.

The present invention has been described in connection with the MC68030 Processor, which has a demand paged memory management unit. It will be understood that the present invention can be utilized with any processor which performs table searches for converting logical addresses to physical addresses. The memory management unit is not necessarily on the same chip as the execution unit and does not necessarily operate in a demand paged mode. In addition, the processor may operate with or without a mass storage device.

While there have been shown and described what are at present considered the preferred embodiments of the present invention, it will be obvious to those skilled in the art that various changes and modifications may be made therein without departing from the scope of the invention as defined by the appended claims.

I claim:

1. An apparatus for translating a physical address into a corresponding logical address, said apparatus being adapted for use with a processor which includes a memory management unit, said apparatus comprising:
   bus means for communicating with said processor, said bus means including an address bus and a data bus;
   address capture means responsive to information on said bus means during table searches by said memory management unit for determining logical addresses;
   storage means for storing said logical addresses at locations identified by the corresponding physical addresses; and
   access means responsive to a physical address provided by said memory management unit during program execution for accessing the corresponding logical address in said storage means and providing said corresponding logical address on an output in real time during program execution by the processor.

2. An apparatus as defined in claim 1 wherein said address capture means comprises:
   subtractor means for subtracting a table address from a table access address and providing a logical address portion during each level of the table search, and
   means for combining the logical address portions from each level of the table search into a logical address.

3. An apparatus as defined in claim 2 wherein said address capture means further includes:
   first register means for temporarily storing said table address, and
   second register means for temporarily storing said table access address, said first and second register means including outputs coupled to inputs of said subtractor means.

4. An apparatus as defined in claim 2 wherein said means for combining logical address portions includes logical address register means and means for transferring outputs of said subtractor means into predetermined positions in said logical address register.

5. An apparatus as defined in claim 1 wherein said storage means comprises a map RAM having a plurality of storage locations for said logical addresses, each storage location corresponding to and addressable by a physical address.

6. An apparatus as defined in claim 5 wherein said storage means further includes a tag RAM having a tag bit corresponding to each storage location in said map RAM, said tag bit indicating whether a valid logical address is stored in the corresponding storage location in said map RAM.

7. An apparatus as defined in claim 6 wherein said access means includes mapper means responsive to a physical address received from said memory management unit for mapping said physical address to a value that corresponds to an address in said map RAM and for setting a bit in said tag RAM when said physical address is within a specified range.

8. An apparatus as defined in claim 7 further including multiplexing means responsive to the state of said tag bit for providing said logical address or said physical address to said output.

9. A method for translating a physical addresses provided by a memory management unit associated with a processor into corresponding logical addresses, said method comprising the steps of:
   determining logical addresses during table searches in which said memory management unit converts logical addresses to physical addresses;
   storing each of said logical addresses at locations identified by the corresponding physical addresses; and
   when a physical address is provided by said memory management unit, accessing the corresponding stored logical address and providing said corresponding logical address in real time during program execution by the processor.

10. A method as defined in claim 9 wherein the step of determining logical addresses includes the steps of:
    subtracting a table address from a table access address to provide a logical address portion during each level of the table search by said memory management unit, and
    combining said logical address portions from each level of the table search into a logical address.

11. An apparatus for transferring bus information from a processor which includes a memory management unit to an analyzer, said bus information including address, data and status fields, said apparatus comprising:
    address capture means responsive to said bus information during table searches by said memory management unit for determining and storing logical addresses;
    translation means responsive to physical addresses provided by said memory management unit during program execution for accessing corresponding logical addresses determined and stored by said address capture means and providing said logical addresses to said analyzer in real time during program execution by the processor; and transfer means for providing to said analyzer data and status fields corresponding to each physical address, said data and status fields being provided to said analyzer simultaneously with the logical address corresponding to each physical address.

12. An apparatus as defined in claim 11 wherein said address capture means, said translation means and said transfer means have parallel pipeline structures.

13. An apparatus as defined in claim 12 wherein said address capture means comprises:

subtractor means for subtracting a table address from a table access address and providing a logical address portion during each level of the table search, and means for combining the logical address portions from each level of the table search into a logical address.

14. An apparatus as defined in claim 13 wherein said address capture means further includes:

first register means for temporarily storing said table address, and second register means for temporarily storing said table access address, said first and second register means including outputs coupled to inputs of said subtractor means.

15. An apparatus as defined in claim 14 wherein said means for combining logical address portions includes logical address register means and means for transferring outputs of said subtractor means into predetermined positions in said logical address register.

16. An apparatus as defined in claim 12 wherein said translation means includes a map RAM having a plurality of storage locations for said logical addresses, each storage location corresponding to and addressable by a physical address.

17. An apparatus as defined in claim 16 wherein said translation means further includes a tag RAM having a tag bit corresponding to each storage location in said map RAM, said tag bit indicating whether a valid logical address is stored in the corresponding storage location in said map RAM.

* * * * *